US006966391B2

(12) United States Patent
Tang

(10) Patent No.: US 6,966,391 B2
(45) Date of Patent: Nov. 22, 2005

(54) GEAR MOTOR FOR POWER TOOL

(75) Inventor: Ernest Tang, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 62 days.

(21) Appl. No.: 10/142,048

(22) Filed: May 10, 2002

(65) Prior Publication Data

US 2002/0185290 A1 Dec. 12, 2002

(30) Foreign Application Priority Data

May 11, 2001 (GB) .................................. 0111535

(51) Int. Cl.[7] ................................................ E21B 4/04
(52) U.S. Cl. ...................................... 173/216; 173/217
(58) Field of Search ................................ 173/178, 216, 173/217, 176; 409/231; 475/298, 299; 310/47, 310/50

(56) References Cited

U.S. PATENT DOCUMENTS 3,872,742 A * 3/1975 States ......................... 475/299
4,467,231 A * 8/1984 Biglino ................. 310/154.17
4,547,687 A * 10/1985 Arai ............................ 310/58
4,763,031 A * 8/1988 Wang .......................... 310/83
4,800,766 A 1/1989 Isozumi et al.
5,056,607 A * 10/1991 Sanders ....................... 173/48
5,089,729 A * 2/1992 Moores, Jr. .................. 310/50
5,196,747 A * 3/1993 Kress et al. .................. 310/89
5,385,512 A * 1/1995 Moolenaar et al. ......... 475/153
5,782,593 A 7/1998 Klement

FOREIGN PATENT DOCUMENTS

| | | |
|---|---|---|
| DE | 33 08 135 A1 | 9/1984 |
| DE | 3634894 A1 | 12/1987 |
| DE | 36 41 656 A1 | 6/1988 |
| DE | 44 12 898 A1 | 10/1995 |
| EP | 1 111 759 A | 6/2001 |
| FR | 2 542 655 A | 9/1984 |
| FR | 2 566 868 A | 1/1985 |
| JP | 8-210455 | 8/1996 |

OTHER PUBLICATIONS

Patent Abstracts of Japan, vol. 1996, No. 12, (1996-12-26) & JP 08 210455 A (1996-08-20).
Patent Abstracts of Japan, vol. 1997, No. 07, (1997-07-31) & JP-09 065608 A (1997-03-07).

* cited by examiner

*Primary Examiner*—Louis K. Huynh
*Assistant Examiner*—Nathaniel Chukwurah
(74) *Attorney, Agent, or Firm*—Birch, Stewart, Kolasch & Birch, LLP

(57) ABSTRACT

A compact gearbox/motor combination for a portable power tool has a single partition plate 23 closing an end of the gearbox housing 24 and the motor housing 19. A shaft 14 of the motor is journalled at one end in a self-aligning bearing 21 supported by an end cap 20 of the motor. The other end of the motor shaft 14 is journalled in a hole 41 in a gear carrier 29 of the gearbox.

11 Claims, 2 Drawing Sheets

GEAR MOTOR FOR POWER TOOL

BACKGROUND

This invention relates to portable power tools and in particular, to a motor and gearbox for a portable power tool. It has special relevance to portable hand held drills and it is in this context that the invention will be explained.

Portable hand held tools such as drills are driven by electric motors, either battery or mains powered. To increase the output torque of the drill, the motor drives the chuck through a speed reduction gear train. To keep the drill compact and for maximum drilling force, epicyclic gearboxes are preferred.

Presently, the drill manufacturer receives a motor and a separate gearbox complete with an output shaft. The motor and gearbox are connected together using a special adapter plate and then the combined motor and gearbox are assembled into the casing of the drill. While this approach works well in aligning the motor to the gearbox, there is little room for reducing the overall length of the drill as desired by current market trends.

Japanese Patent Application JP 8-210455 discloses a stepper motor/gearbox combination in which the motor end cap and gearbox cover are combined as a single item with the gearbox end of the motor shaft being supported directly by the planet gears of the gearbox. This provides an axially compact motor/gearbox combination. However, there are concerns about the stability of the motor, especially under high torque/high load applications experienced, for example, in a power tool application such as a drill. For motors with very small air gaps such as DC motors used in hand held portable cordless drills, the radial movement of the motor shaft allowed by the meshing of the planet gears with the sun gear of the shaft may affect the performance of the motor.

SUMMARY OF THE INVENTION

To ensure radial movement of the shaft is kept to a minimum, the present invention, while combining the gearbox cover and motor end cap and eliminating the normal bearing in the end cap, journals the motor shaft in the carrier for the planet gears.

Accordingly, in one aspect thereof, the present invention: a motor and gearbox combination for use in a portable power tool, having: a motor section comprising: a motor housing having a first end and an open second end; a bearing supported at the first end of the motor housing; a stator fixed to the motor housing; a partition plate fixed to the second end of the motor housing; a motor shaft journalled at one end in the bearing and extending through the partition plate; a rotor mounted on the motor shaft in confrontation with the stator; a gearbox section comprising: a gearbox housing fixed to the partition plate; the gear box housing accommodating a gear train comprising at least: a sun gear fitted to the motor shaft; a carrier plate having a number of spigots; a ring gear surrounding the carrier plate; a number of planet gears in mesh with the sun gear and the ring gear; and mounted on respective spigots of the carrier plate for driving the carrier plate; and an output shaft driven by the gear train and mounted in a bushing fitted to an opening in the gearbox housing, wherein the other end of the shaft is journalled in a component of the gear train.

Preferably, the shaft is journalled in a hole in the carrier plate.

Alternatively, the shaft is journalled in a hole in the output shaft.

Preferably, the epicyclic gear train is a two stage planetary gear system with the sun gear of the motor shaft engaging three planetary gears carried by a first carrier plate with a second sun gear fixed to the first carrier plate in mesh with a further three planetary gears in mesh with the ring gear and supported by a second carrier plate with the output shaft being driven by the second carrier plate.

Preferably, the gearbox housing is a moulded part of synthetic resin and teeth of the ring gear are moulded directly onto the gearbox housing.

BRIEF DESCRIPTION OF THE DRAWING

The preferred embodiments of the invention will now be described, by way of example only, with reference to the drawings, in which.

DETAILED DESCRIPTION OF THE PREFERRED EMBODIMENT

Figure 1:
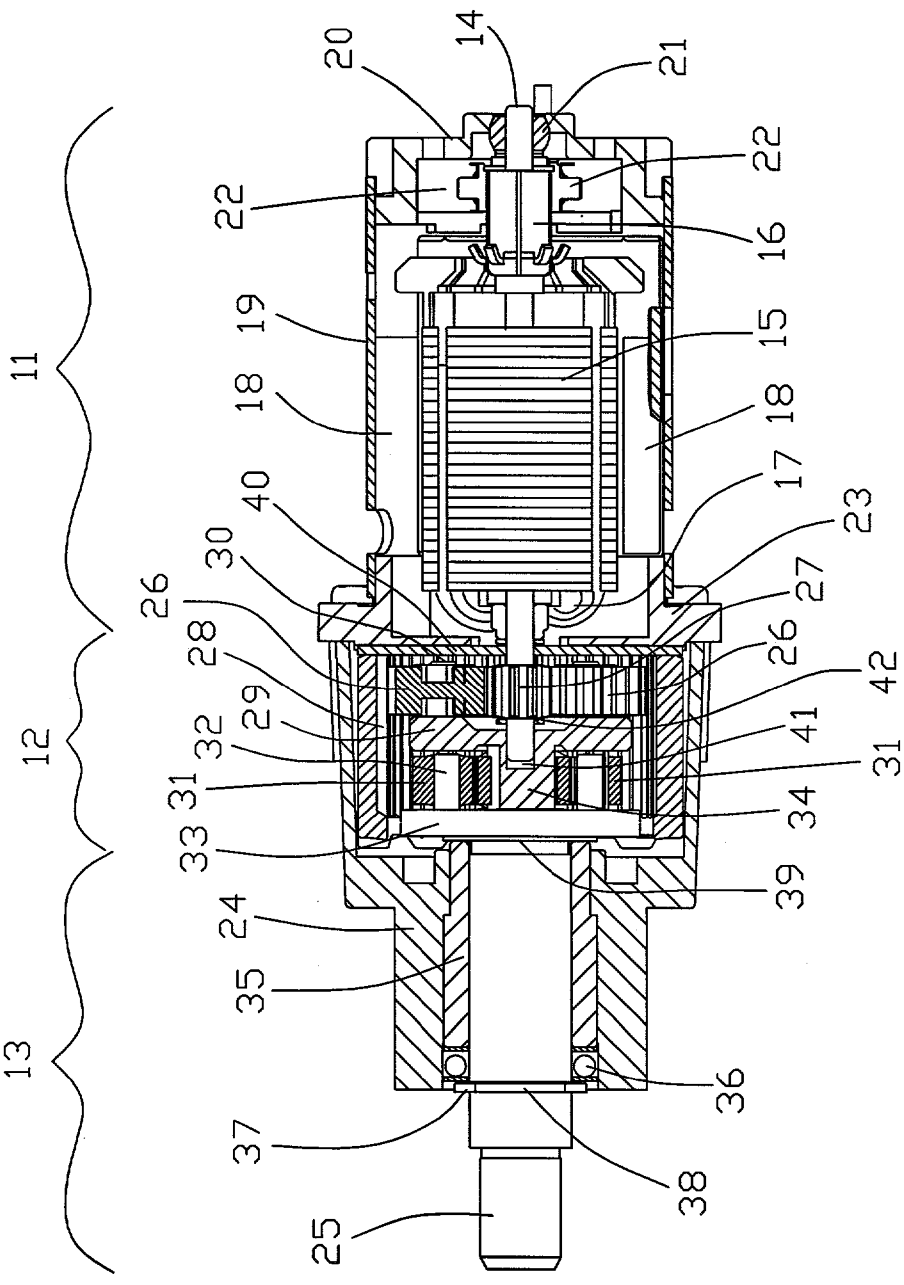
FIG. 1 is a sectional view of the preferred motor/gearbox combination constructed in accordance with the present invention.

FIG. 1 shows a motor/gearbox combination suitable for use in a hand held power tool such as a drill or electric screwdriver. The combination has a compact overall length. The combination can be divided into two sections, namely: a motor section 11 and a gearbox section 12 which includes an output section 13.

The motor section 11, shown on the right, incorporates a DC motor having a permanent magnet stator and a wound rotor. The rotor has a shaft 14, a rotor core 15 and commutator 16 fitted to the shaft 14, with rotor windings 17 wound around the rotor core 15 and terminated on the commutator 16.

The stator has permanent magnets 18 disposed inside a tubular housing 19. An end cap 20 closes off the right hand end of the tube 19. The end cap 20 is made of an insulating synthetic resin and supports a bearing 21, brush gear 22 and motor terminals (not shown). The bearing 21 is a self-aligning oil-impregnated sintered bronze bushing in which one end of the rotor shaft is journalled.

A partition plate 23 is fixed to the left hand end of the tube 19. The partition plate 23 acts as a divider between the motor section 11 and the gearbox section 12.

The gearbox section 12 has a gearbox housing 24 which is bolted to the partition plate 23. The gearbox housing 24 accommodates the gear train and extends into the output section 13 to support the output shaft 25. The gear train is a double or two stage planetary gear type speed reduction gear train.

Each stage has a gear carrier which supports three planet gears on spigots. The three first stage planet gears 26 engage a first sun gear 27 in the form of a pinion on the motor shaft 14 and also engage teeth 28 formed on the inner wall of a separate ring gear fitted into the housing (as shown) or formed directly on an inner wall of the gearbox housing 24. Thus, when the motor turns, the pinion or sun gear 27 drives the first planet gears 26 around the inner wall of the housing 24, in turn rotating the first gear carrier 29 via first spigots 30. To the left of the first stage planetary gear is the second stage planetary gear. Again, three second stage planet gears 31 are supported on spigots 32 of a second gear carrier 33 and engage a second sun gear 34 and the teeth 28 formed on the inner wall of the gearbox housing 24. The second sun gear 34 is fixed to the rear surface of the first carrier 29 for rotation therewith. The output shaft 25 is fixed to the rear surface of the second carrier 33 for rotation therewith and is supported by a long bushing 35 pressed into the left hand end of the gearbox housing 24. A thrust bearing assembly 36 is located between the bushing 35 and a C-'ring 37 fitted to a circumferential groove 38 in the output shaft 25 to accept thrust loading applied to the output shaft.

The motor shaft 14, output shaft 25 and the first and second sun gears 27, 34 are all co-axial. A washer 39 is placed between the long bushing 35 and the second carrier 33. A second washer 40 is placed between the partition plate 23 and the first planet gears 26, to provide axial support.

The first carrier 29 has a central recess 41 which forms a bearing support for the left hand end of the motor shaft 14. A washer 42 between the first carrier 29 and the pinion 27 provides axial support for the motor shaft 14. By journalling the shaft 14 in the first carrier 29, the normal pinion end bearing of the motor is eliminated, allowing the partition plate 23 to be thinner than the normal end cap assembly which would normally support the bearing. This single partition plate 23 replaces the prior art mounting plate, gearbox cover and motor end cap assembly, producing a significant reduction in overall motor/gearbox length. Also, the pinion 27 is now inboard of the shaft bearing meaning that any misalignment in the positioning of the gearbox end bearing is not amplified in the position of the pinion as in the case of a cantilevered or outboard pinion. Also any slack between the pinion and the planet gears and/or between the planet gears and the ring housing teeth does not affect the concentricity of the shaft directly. The self-aligning bearing 21 at the right hand end of the motor allows for slight misalignment of the motor shaft 14 and the bearings 21, 41.

Figure 2:
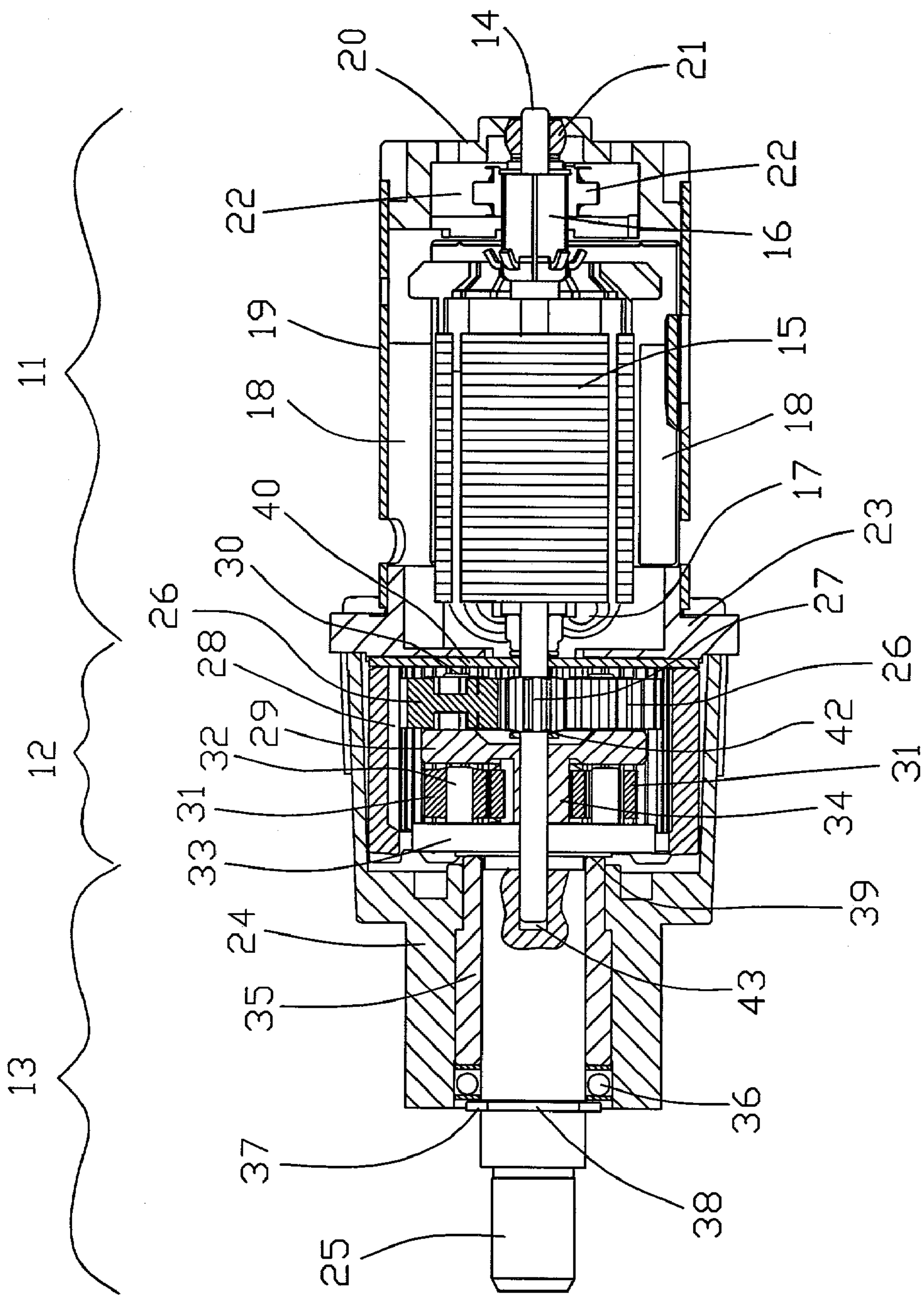
FIG. 2 is a view similar to FIG. 1 modified according to a second embodiment.

Should the shaft require very precise position, for example, when using a motor with a very small air gap, then the arrangement shown in FIG. 2 may be advantageous. In this embodiment, the output end of the motor shaft 14 extends through the first planet gear carrier, through the second planet gear, through the second gear carrier and is journalled in a hole 43 in the end of the output shaft 25. The output shaft 25 is a precision made shaft and is well supported by the long bushing 35, thus ensuring precise positioning of the output end of the motor shaft 14. This is particularly suited to a single stage epicyclic gear train.

ADVANTAGES OF THE INVENTION

As described above, the combined motor and gearbox is axially compact by eliminating the separate bearing at the pinion end of the motor shaft and by replacing the gearbox cover plate, the mounting plate and a motor end plate by a single partition plate. Also, there is a saving on weight due to the shared parts resulting in a shorter and lighter tool which is especially appreciated for battery powered portable tools such as drills and screw drivers. The journalling of the motor shaft in the planet gear carrier ensures proper concentricity between the shaft and the gearbox.

By combining the gearbox and motor together as a single unit, the assembly of the power tool is simplified. There are no alignment problems between the motor and the gearbox for the tool manufacturer.

Although a PMDC motor has been described, other types of motors such as brushless DC motors, universal motors and other AC motors may be used by suitable adaptation of the motor arts involved.

The embodiment described above is given by way of example only and various modifications will be apparent to persons skilled in the art without departing from the scope of the invention as defined in the appended claims.

What is claimed is:

1. A motor and gearbox combination for use in a portable power tool, having:

a motor section comprising:
- a motor housing having a first end and an open second end;
- a bearing supported at the first end of the motor housing;
- a stator fixed to the motor housing;
- a partition plate fixed to the second end of the motor housing;
- a motor shaft journalled at one end in the bearing and extending through the partition plate; and
- a rotor mounted on the motor shaft in confrontation with the stator;

a gearbox section comprising:
- a gearbox housing fixed to the partition plate;
- the gear box housing accommodating a gear train comprising at least:
- a sun gear fitted to the motor shaft;
- a carrier plate having a number of spigots;
- a ring gear surrounding the carrier plate;
- a number of planet gears in mesh with the sun gear and the ring gear, and mounted on respective spigots of the carrier plate for driving the carrier plate; and
- an output shaft driven by the gear train and mounted in a bushing fitted to an opening in the gearbox housing, wherein the other end of the motor shaft is journalled in a hole in one of the carrier plate and the output shaft.

2. The combination of claim 1 wherein the motor housing is tubular and the first end of the motor housing is closed by a separate end cap which supports the bearing.

3. The combination of claim 1, wherein the rotor is a wound rotor including a commutator and the end cap supports brush gear in contact with the commutator for transferring electrical power thereto.

4. The combination of claim 1 wherein the epicyclic gear train is a two stage planetary gear system with the sun gear of the motor shaft engaging three planetary gears carried by a first carrier plate with a second sun gear fixed to the first carrier plate in mesh with a further three planetary gears in mesh with the ring gear and supported by a second carrier plate with the output shaft being driven by the second carrier plate.

5. The motor and gearbox combination of claim 1, wherein the motor is a PMDC motor, the stator is a permanent magnet stator, the rotor is a salient pole wound rotor having a commutator, and the end cap is an insulating synthetic resin cap supporting motor terminals and a pair of brushes in sliding contact with the commutator.

6. The combination of claim 1 wherein the motor is a brushless D.C. motor.

7. The combination of claim 1 wherein the motor is a universal type motor.

8. The combination of claim 1 wherein the ring gear is formed as a metallic sleeve which is pressed into the gearbox housing.

9. The combination of claim 1, wherein the gearbox housing is a moulded part of synthetic resin and teeth of the ring gear are moulded directly onto the gearbox housing.

10. A motor and gearbox combination for use in a portable power tool, comprising:
- a motor having a motor shaft;
- a gearbox having an epicyclic gear train including an output shaft driven by the gear box;
- wherein the motor shaft is journalled at one end in the bearing of the motor and is journalled at another end only in a hole of one of the carrier plate and the output shaft.

11. A portable power tool incorporating a motor and gearbox combination, comprising:
- a motor section comprising:
  - a motor housing having a first end and an open second end;
  - a bearing supported at the first end of the motor housing;
  - a stator fixed to the motor housing;
  - a partition plate fixed to the second end of the motor housing;
  - a motor shaft journalled at one end in the bearing and extending through the partition plate; and
  - a rotor mounted on the motor shaft in confrontation with the stator;
- a gearbox section comprising:
  - a gearbox housing fixed to the partition plate;
  - the gearbox housing accommodating a gear train comprising at least:
  - a sun gear fitted to the motor shaft;
  - a carrier plate having a number of spigots;
  - a ring gear surrounding the carrier plate;
  - a number of planet gears in mesh with the sun gear and the ring gear, and mounted on respective spigots of the carrier plate for driving the carrier plate; and
  - an output shaft driven by the gear train and mounted in a bushing fitted to an opening in the gearbox housing,
- wherein the other end of the motor shaft is journalled in a hole in one of the carrier plate and the output shaft.

* * * * *